United States Patent Office 3,304,314
Patented Feb. 14, 1967

3,304,314
NOVEL 9β,10α-STEROIDS AND PROCESS FOR THE MANUFACTURE THEREOF
Engbert Harmen Reerink, Hendrik Frederik Louis Scholer, and Pieter Westerhof, all of Van Houtenlaan, Weesp, Netherlands, assignors to North American Philips Company, Inc., New York, N.Y., a corporation of Delaware
No Drawing. Filed June 24, 1965, Ser. No. 466,818
Claims priority, application Switzerland, June 26, 1964, 8,465/64
27 Claims. (Cl. 260—397.4)

This application is a continuation-in-part of our pending application Serial No. 343,197, filed February 7, 1964.

The invention is concerned with novel 6-halogen-9β,10α-steroids of the general Formula I

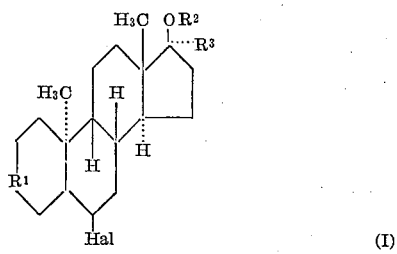

wherein $R^1$ represents a 3-keto-4-dehydro-, a 3-keto-4,6-bisdehydro, a 3-keto-1,4-bisdehydro-, a 3-keto-1,4,6-trisdehydro- or a 3-alkoxy-3,5-bisdehydro-system, $OR^2$ represents a free, esterified or etherified hydroxy group, $R^3$ represents an alkyl or alkinyl group and Hal represents a fluorine, chlorine or bromine atom.

The invention is also concerned with processes for the manufacture of the steroids of the general Formula I.

9β,10α-steroids are steroids in which, in the sense of the above Formula I, the hydrogen atoms in positions 8 and 9 as well as the 13-methyl group show the β-configuration and the 14-hydrogen atom and the 10-methyl group show the α-configuration such as is the case with dihydro-isolumisterone. A deviation from the normal series of steroids therefore exists with reference to the configuration of the 9-hydrogen atom (9β) and the 10-methyl group (10α).

The alkyl group in a 3-alkoxy group is preferably an aliphatic, cycloaliphatic or araliphatic alkyl group having 1–10 C-atoms. Examples of such groups are: methyl, ethyl, propyl, tert.-butyl, cyclopentyl, cyclohexyl and benzyl.

An esterified 17-hydroxy group is preferably an acyloxy group of which the acyl residue is derived from a saturated or unsaturated aliphatic or cycloaliphatic, an araliphatic or aromatic carboxylic acid having 1–20 C-atoms. Examples of such acids are: formic acid, acetic acid, pivalic acid, propionic acid, butyric acid, caproic acid, heptanoic acid, oleic acid, palmitic acid, stearic acid, succinic acid, malonic acid, citric acid, benzoic acid.

An etherified 17-hydroxy group is preferably an alkoxy group of which the alkyl residue contains 1–10 C-atoms and is aliphatic, cycloaliphatic or araliphatic in type. Examples of such groups are: methyl, ethyl, propyl, tert.-butyl, cyclopentyl, cyclohexyl, benzyl. Further examples of etherified 17-hydroxy groups are: cyclopentene-(1)-yloxy, 1'-ethoxy-cyclopentyloxy and tetrahydro-pyranyloxy. The 6-halogen atom of 6,7-saturated compounds may be α- or β-orientated. The $R^3$-groups are preferably lower alkyl or lower alkinyl groups containing up to 3 carbon atoms, e.g. methyl, ethyl, propyl, isopropyl, ethinyl or methyl-ethinyl.

Examples of 6-halogen-9β,10α-steroids of the general Formula I are:

6β-chloro-17α-methyl-17β-acetoxy-9β,10α-androst-4-en-3-one,
6-chloro-17α-methyl-17β-acetoxy-9β,10α-androsta-4,6-dien-3-one,
6-chloro-17α-methyl-17β-hydroxy-9β,10α-androsta-1,4,6-trien-3-one,
6-chloro-17α-methyl-17β-hydroxy-9β,10α-androsta-4,6-dien-3-one,
6α-fluoro-17α-methyl-17β-acetoxy-9β,10α-androst-4-en-3-one,
6β-fluoro-17α-methyl-17β-acetoxy-9β,10α-androst-4-en-3-one,
6β-bromo-17α-methyl-17β-acetoxy-9β,10α-androst-4-en-3-one,
6α-bromo-17α-methyl-17β-acetoxy-9β,10α-androst-4-en-3-one,
6-bromo-17α-methyl-17β-acetoxy-9β,10α-androsta-4,6-dien-3-one,
6-bromo-17α-methyl-17β-acetoxy-9β,10α-androsta-1,4,6-trien-3-one,
6β-chloro-17α-ethyl-17β-acetoxy-9β,10α-androst-4-en-3-one,
6-chloro-17α-ethyl-17β-acetoxy-9β,10α-androsta-4,6-dien-3-one,
6-chloro-17α-ethyl-17β-acetoxy-9β,10α-androsta-1,4,6-trien-3-one,
6-chloro-17α-ethyl-17β-hydroxy-9β,10α-androsta-4,6-dien-3-one,
6-fluoro-17α-methyl-17β-acetoxy-9β,10α-androsta-4,6-dien-3-one,
6-fluoro-17α-ethyl-17β-acetoxy-9β,10α-androsta-4,6-dien-3-one,
6β-chloro-17α-propyl-17β-acetoxy-9β,10α-androst-4-en-3-one,
3-ethoxy-6-chloro-17α-methyl-17β-acetoxy-9β,10α-androsta-3,5-diene,
6-chloro-17α-methyl-3,17β-dimethoxy-9β,10α-androsta-3,5-diene,
3-ethoxy-6-fluoro-17α-ethyl-17β-hydroxy-9β,10α-androsta-3,5-diene,
6β-chloro-17α-methyl-17β-hydroxy-9β,10α-androsta-1,4-diene-3-one,
6β-chloro-17α-ethinyl-17β-acetoxy-9β,10α-androst-4-en-3-one,
6-chloro-17α-ethinyl-17β-acetoxy-9β,10α-androsta-4,6-dien-3-one,
6β(and 6α)-fluoro-17α-ethinyl-17β-acetoxy-9β,10α-androst-4-en-3-one,
6-chloro-17α-ethinyl-17β-hydroxy-9β,10α-androsta-4,6-dien-3-one,
6-chloro-17α-ethinyl-17β-acetoxy-9β,10α-androsta-1,4,6-trien-3-one,
6α-fluoro-17α-ethinyl-17β-acetoxy-9β,10α-androsta-1,4-dien-3-one,
6-chloro-17α-ethinyl-17β-hydroxy-9β,10α-androsta-1,4,6-trien-3-one.

The 6-halogen-9β,10α-steroids of Formula I may be prepared in accordance with methods known for the preparation of the corresponding normal 6-halogen-steroids.

A preferred manufacturing process consists in using a 9β,10α-steroid of the general Formula II

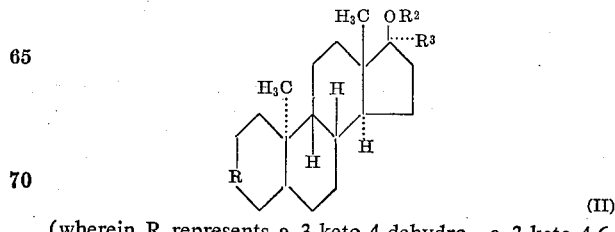

(wherein R represents a 3-keto-4-dehydro-, a 3-keto-4,6- bisdehydro-, a 3-OR⁴-3,5-bisdehydro-system in which OR⁴ stands for an esterified or etherified hydroxy group and OR² as well as R³ have the above significance) as the starting material and halogenating this steroid in the 6-position in accordance with methods which are known per se from the normal series of steroids and, if desired, dehydrogenating, esterifying, etherifying, converting into a 3-enol ether, saponifying or submitting to ether-cleavage in further process steps the 6-halogen compound obtained.

The halogenation of compounds of Formula II can, for example, be accomplished in accordance with one of the following methods which are known per se:

(a) A 3-keto-Δ⁴-9β,10α-steroid of the general Formula IIa

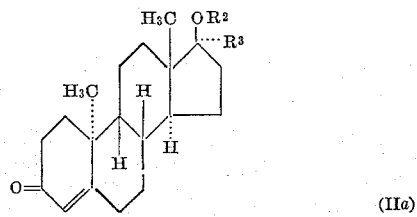

(IIa)

(wherein OR² and R³ have the above significance) can be halogenated in the 6-position by reaction with a halogenating agent, such as an N-halo-imide (e.g., N-bromosuccinimide), or with a halogen (e.g., with elementary bromine) [see J. Am. Chem. Soc., 1950, 72, 4534].

(b) A 9β,10α-Δ³,⁵-3-enolester (or 3-enolether)-steroid of the general Formula IIb

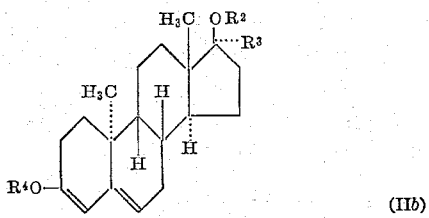

(IIb)

(wherein OR⁴ represents an esterified or etherified hydroxy group (preferably an acyloxy- or alkyloxy-group of the type previously defined) and OR² as well as R³ have the above significance) can be halogenated in the 6-position by reaction with chlorine or bromine [J. Am. Chem. Soc., 1960, 82, 1230], with N-haloimides [J. Am. Chem. Soc., 1960, 82, 1230; 1955, 77, 3827] or, for example, with perchloryl fluoride [J. Am. Chem. Soc., 1959, 81, 5259; Chem. and Ind., 1959, 1317].

This mode of operation is particularly adapted to the manufacture of 6-fluoro (chloro or bromo)-9β,10α-3-keto-Δ⁴-steroids.

The 6-fluoro derivatives are preferably prepared by reacting a compound of the above Formula IIb (preferably one having an esterified or etherified 17-hydroxy group) with perchloryl fluoride, preferably in dioxane-water or acetone-ethanol in the presence of an alkali acetate. The fluorination proceeds to a mixture of the 6β- and the 6α-fluoro isomer in which the latter isomer preponderates. Both the isomers may be separated from one another by, for example, chromatography and/or by fractional crystallization. By isomerisation with a hydrohalic acid (e.g., HCl or HBr in acetic acid, ethanol, dioxan or chloroform) the α-isomers can be converted into the more stable β-isomers, if desired.

The 6-chloro derivatives are preferably prepared by treating a compound of the above Formula IIb (preferably one having an esterified or etherified 17-hydroxy group) with a chlorinating agent such as chlorine or an N-chlorimide (such as N-chloro-acetamide or N-chlorosuccinimide). The so-formed mixture of 6α- and 6β-chloro isomers can be separated by chromatography and/or fractional crystallization. The 6α-isomers can be isomerised to the 6β-isomers in accordance with the above named methods.

The 6-bromo derivatives are preferably prepared in an analogous way to the 6-chloro derivatives. The separation of the obtained mixture of isomers as well as the isomerisation of the 6α-bromo to the 6β-bromo derivatives can likewise be carried out in an analogous fashion.

(c) A 9β,10α-Δ⁴,⁶-steroid of the general Formula IIc

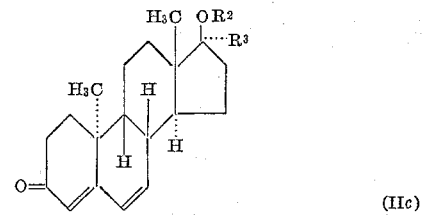

(IIc)

(wherein OR² and R³ have the above significance) can be converted into the desired 6-halogen derivative by reaction with chromyl chloride [e.g. in accordance with U.S. Patent 3,076,823] and subsequent splitting of water from the 7-OH compound which is formed.

The reaction of the compounds of the above Formula IIc with chromyl chloride is conveniently effected in anhydrous solvents such as chloroform or carbon tetrachloride. The dehydration of the 6-chloro-7-hydroxy derivative which is first obtained can be carried out, for example, in acid media (e.g. hydrogen chloride or hydrogen bromide in acetic acid, acetone, methanol, dioxan, tetrahydrofuran).

(d) Furthermore, a compound of the Formula IIc can also be halogenated in position 6 by first converting it with a peracid (such as perphthalic acid) into a 9β,10α-Δ⁴-6,7-epoxy steroid of the general Formula IId

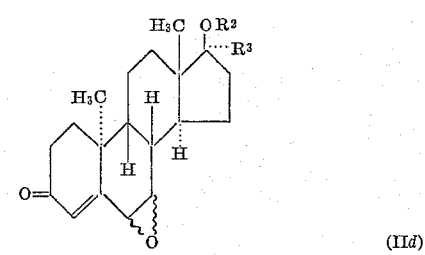

(IId)

(wherein OR² and R³ have the above significance) and treating this epoxy steroid (which can also be obtained by treatment of the above-mentioned 6-chloro-7-hydroxy compound with alkali) with hydrogen fluoride, hydrogen chloride or hydrogen bromide [Chem. Ber. 1961, 94, 1225] and splitting of water from the reaction product.

The introduction of a Δ⁶-double bond into a 6,7-saturated 6-halogen product obtained can be effected as follows:

(e) A 6-halogen-9β,10α-3-keto-Δ⁴-steroid of the general Formula Ia

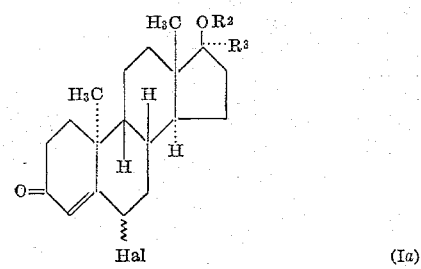

(Ia)

(wherein Hal, OR² and R³ have the above significance) can be dehydrogenated in the 6,7-position; for example, with a substituted benzoquinone such as chloranil [J. Am. Chem. Soc. 1960, 82, 4293; 1959, 81, 5951] or with 2,3-dichloro-5,6-dicyanobenzoquinone or with manganese dioxide [J. Am. Chem. Soc. 1953, 75, 5932].

(f) A 6-halogen-9β,10α-Δ³,⁵-3-enolether-steroid of the general Formula Ib

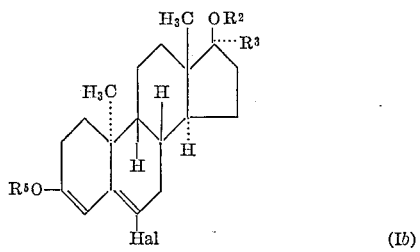

(Ib)

(wherein OR⁵ represents an etherified hydroxy group (especially a 3-alkoxy group of the type defined above) and OR² and R³ have the above significance) can be converted into the corresponding 6-halogen-9β,10α-Δ⁴,⁶-3-ketone by reaction with 2,3-dichloro-5,6-dicyano-benzoquinone.

The introduction of a Δ¹-double bond can be effected as follows:

(g) A 6-halogen-9β,10α-3-keto-Δ⁴-(or Δ⁴,⁶)-steroid of the general Formula Ia or Ic

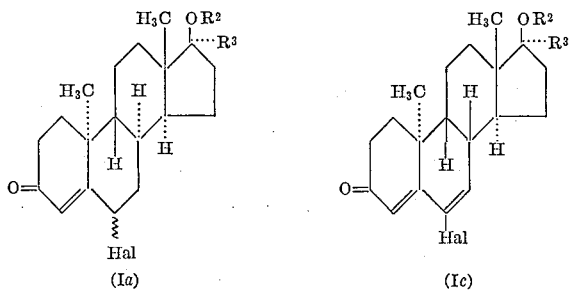

(Ia)        (Ic)

can be dehydrogenated in the 1,2-position in a microbiological way or with dehydrogenation agents such as iodine pentoxide, periodic acid or selenium dioxide [J. Am. Chem. Soc., 1959, 81, 1235; 5951], with 2,3-dichloro - 5,6 - dicyano - benzoquinone [Proc. Chem. Soc., 1960, 14], with lead tetraacetate [J. Am. Chem. Soc., 1955, 77, 661] or with chloranil [J. Am. Chem. Soc., 1960, 82, 4293]. Δ¹,⁴,⁶-derivatives can be obtained directly from the Δ⁴-unsaturated compounds with chloranil or 2,3-dichloro-5,6-dicyano-benzoquinone.

Methods which are known from the chemistry of the normal steroids can find use for the eventual esterification or etherification of compounds obtained which have free hydroxy groups, for the enoletherification of the 3-keto-Δ⁴-system, as well as for the saponification of esterified hydroxy groups or the cleavage of etherified hydroxy groups.

The acetyl group of compounds of Formula Ic wherein Hal is chlorine and R² is acetyl can reductively split off by means of LiAlH₄ in the cold. The 3-hydroxy group which is obtained by this procedure can be re-oxidised by known methods.

The enoletherification of 6-halogen-9β,10α-3-keto-Δ⁴-steroids for the purpose of introducing the 3-alkoxy-Δ³,⁵-system can be carried out, for example, as follows:

(h) The 3-keto-Δ⁴-steroid obtained is reacted with an alcohol (e.g. methanol, ethanol, benzyl alcohol) in the presence of a catalyst (e.g. p-toluenesulphonic acid) or with an orthoformic acid ester in the presence of a catalyst (e.g. with orthoformic acid ethyl ester and hydrochloric acid) or with a dialkoxy-propane (e.g. dimethoxypropane in methanol/dimethylformamide in the presence of a catalyst (such as p-toluenesulphonic acid).

The starting compounds of Formula II, insofar as they are not known, can be prepared in accordance with known methods.

The 6-halogen-9β,10α-steroids of the Formula I possess hormone activity. As compared with the corresponding steroids of the normal series they are differently decomposed in vivo, thereby not being admitted into the hormone-pool of the body. They show more specific hormone activity, for example, anabolic properties with a favourable anabol/androgen ratio and parenteral and/or oral gestagenic activity. The influence on the gonadotrophin economy may also be mentioned as a further property of the compounds of the invention—which, for example, is of value for the treatment of fertility disorders and hypogonadisms of all kinds.

The compounds of this invention may be used as medicaments in the form of pharmaceutical preparations which contain them in admixture with a pharmaceutical organic or inorganic inert carrier material suitable for enteral or parenteral administration, such as, for example, water, gelatin, lactose, starch, magnesium stearate, talc, vegetable oils, gums, polyalkylene glycols or petroleum jelly. The pharmaceutical preparations may be in solid form (e.g. as tablets, dragées, suppositories or capsules) or in a liquid form (e.g. as solutions, suspensions or emulsions). If desired, they may be sterilized and/or contain auxiliary substances such as preserving, stabilizing, wetting or emulsifying agents, salts for varying the osmotic pressure or buffers. They may also contain, in combination, other therapeutically valuable substances.

In the following examples all temperatures are given in degrees centigrade.

Example 1

A solution of 21.0 g. of 3,17β-diacetoxy-17α-methyl-9β,10α-androsta-3,5-diene in 300 ml. of absolute ether was added, while stirring, to a solution of 41.0 g. of potassium acetate in 720 ml. of acetic acid and 130 ml. of water. After cooling to 0° to —5° a solution of 3.5 g. of chlorine in 120 ml. of acetic acid was slowly added dropwise thereto while stirring and cooling. Subsequently the mixture was stirred for a further 10 minutes at 0°, then poured into water and extracted with ether. The ether extracts were washed neutral with sodium bicarbonate solution and water and dried over sodium sulphate. After evaporation of the solvent the crude product was recrystallized from acetone/isopropyl ether, melting point 165–166°. After a two-fold crystallization from acetone/isopropyl ether the 6β-chloro-17α-methyl-17β-acetoxy-9β,10α-androst-4-en-3-one shows a melting point of 170–171°.

UV: $\lambda_{max}$ 235 mμ, ε=15300;

$$[\alpha]_{589}^{25°} = -90.6°$$

(c.=0.1 in dioxan); IR-bands at 5.83; 6.00; 6.19; 6.80; 6.92; 7.09; 7.35; 7.58; 7.92μ.

The compound has anabolic/androgenic activity; acts uterotrophically and inhibits the action of exogenic estradiol.

The 3,17β - diacetoxy-17α-methyl-9β,10α-androsta-3,5-diene used as the starting material was obtained as follows:

To a solution of 1.0 g. of 17α-methyl-17β-hydroxy-9β,10α-androst-4-en-3-one and 0.1 g. of p-toluenesulphonic acid in 40 ml. of absolute benzene was added dropwise within 3 hours a solution of 40 ml. of isopropenyl acetate in 80 ml. of benzene while 80 ml. of benzene were simultaneously distilled off through a Vigreux-column. After cooling the reaction mixture was treated with 0.1 ml. of pyridine, the precipitate filtered off and the filtrate concentrated in vacuum. From the residue there was obtained 3,17β-diacetoxy-17α-methyl-9β,10α - androsta - 3,5-diene of melting point 128–130° (from isopropyl ether).

UV: $\lambda_{max}$ 235 mμ, ε=19000;

$$[\alpha]_{589}^{25°} = 43°$$

(c.=0.1 in dioxan).

Example 2

A mixture of 4.4 g. of 6β-chloro-17α-methyl-17β-acetoxy-9β,10α-androst-4-en - 3 - one, 240 mg. p - toluenesulphonic acid, 3.6 g. of orthoformic acid ethyl ester and 60 ml. of dioxan was left to stand for 7 hours in the dark at room temperature. This solution was added dropwise within 5 minutes to a well-stirred mixture of 240 ml. of glacial acetic, 18 ml. of water and 21.6 g. of manganese dioxide. It was stirred for 60 minutes at 25°, thereafter filtered off from the manganese dioxide and washed out well with glacial acetic and methylene chloride. The filtrate was poured into ice-water and extracted with methylene chloride/petroleum ether (1:1). The organic extract was washed with sodium carbonate solution and water, dried with sodium sulphate and evaporated. The residue (4.6 g.), dissolved in benzene, was filtered through 50 g. of aluminium oxide. The substance obtained from the eluate was recrystallized from acetone/hexane and yielded 2.5 g. of pure 6-chloro-17α-methyl-17β-acetoxy-9β,10α-androsta-4,6-dien-3-one of melting point 153–154°.

UV: $\lambda_{max.}$ 286 m$\mu$, $\epsilon$=21800;

$$[\alpha]_{589b}^{25°} = -388°$$

(c.=0.1 in dioxan); IR-bands at 5.83; 6.05; 6.22; 6.35; 6.92; 7.36; 7.98$\mu$.

The compound is anabolically/androgenically active; acts uterotrophically and inhibits the action of exogenic estradiol; shows oestrogen-like action in intact, but not in castrated animals and acts as a strong gestagen orally and parenterally.

Example 3

A solution of 1.8 g. of 6-chloro-17α-methyl-17β-acetoxy-9β,10α-androsta-4,6-dien-3-one and 1.62 g. of 2,3-dichloro-5,6-dicyano-benzoquinone in 180 ml. of dioxan was heated to reflux for 5 hours under nitrogen.

For purpose of working up the mixture was diluted with 200 ml. of benzene and filtered through 25 g. of aluminium oxide. The substance was eluted with ether. After evaporation of the eluate there was obtained 1.42 g. of a yellow oil which was chromatographed on 35 g. of aluminium oxide. The petroleum ether/benzene (1:1) fractions were recrystallized from acetone/hexane and there were obtained 0.65 g. of pure 6-chloro-17α-methyl-17β-acetoxy-9β,10α-androsta-1,4,6-trien-3-one of melting point 130–131°.

UV: $\lambda_{max.}$ 228, 251 and 300 m$\mu$; $\epsilon$=11900, 10700 and 10350;

$$[\alpha]_{589}^{25°} = -235°$$

(c.=0.1 in dioxan); IR-bands at 5.79; 6.04; 6.23; 6.85; 7.15; 7.32$\mu$.

The compound is anabolically/androgenically active; acts uterotrophically and inhibits the action of exogenic estradiol; shows estrogen-like action in intact but not in castrated animals and acts as a strong gestagen orally and parenterally.

Example 4

To a solution of 0.5 g. of 6-chloro-17β-acetoxy-17α-methyl-9β,10α-androsta-4,6-dien-3-one in 40 ml. of absolute ether is added dropwise while stirring at 0° a solution of 200 mg. of lithium aluminium hydride in 20 ml. of absolute ether within 10 minutes. The solution was maintained for a further 5 minutes at 0°, then carefully treated with moist ether and saturated sodium sulphate solution until a granular precipitate had resulted. This precipitate was filtered off and then washed well with methylene chloride. The filtrate was dried over sodium sulphate and concentrated in vacuum. There were obtained 0.5 g. of crystals which were dissolved in 40 ml. of chloroform and stirred for 2 hours at room temperature with 3.0 g. of manganese dioxide. Thereafter, it was filtered off from the manganese dioxide and then washed well with methylene chloride. After evaporation of the solvent the filtrate yielded 0.46 g. of a brown foamy residue which was chromatographed on silica gel. There were eluted with benzene/ether (1:1) 170 mg. of a uniform material which yielded pure 6-chloro-17α-methyl-17β-hydroxy-9β, 10α-androsta-4,6-dien-3-one of melting point 183–184° (from acetone/isopropyl ether).

UV: $\lambda_{max.}$ 287 m$\mu$, $\epsilon$=21000;

$$[\alpha]_{589}^{25°} = -452°$$

(c.=0.1 dioxan); IR-bands at 3448, 1605, 1580 cm.$^{-1}$.

Example 5

To a solution of 5.0 g. of 3,17β-acetoxy-17α-methyl-9β,10α-androsta-3,5-diene in 125 ml. of acetone were added 2.7 g. of anhydrous sodium acetate dissolved in 75 ml. of absolute ethanol. The reaction mixture was then cooled to 0° under nitrogen. A moderate stream of perchloryl fluoride was passed through the mixture for 6.5 hours. The gas was first passed through a 4 N sodium hydroxide solution and subsequently through a drying tower packed with NaOH pellets. After completing the reaction nitrogen was passed through in order to remove the excess perchloryl fluoride.

The reaction solution was then filtered, treated with 1 liter of ethyl acetate and washed with 500 ml. of water. Thereafter it was extracted twice with 500 ml. of saturated bicarbonate solution each time and then washed twice with 500 ml. of water each time. The organic solution was dried over sodium sulphate and concentrated in vacuum to dryness; yield 5.53 g. of a brown oil. 32.5 g. of the fluorinated product from a variety of such batches were chromatographed on 1800 g. of silica gel (Merck 0.05–0.2 mm.). Benzene (containing 0.5–4% acetone) served as the elution agent, whereby the acetone content was increased about 0.5% after each 3–4 liters. 30 ml. fractions were collected.

The fractions 105–230 contained 8.7 g. of uniform substance which, when crystallized from methylene chloride/hexane, yielded 4.1 g. of colorless crystals of 6α-fluoro-17α - methyl - 17β - acetoxy-9β,10α-androst-4-en-3-one, melting point 114–116°.

UV: $\lambda_{max.}$ 230 m$\mu$, $\epsilon$=13300;

$$[\alpha]_{589}^{25°} = -59°$$

(c.=0.1 in dioxan). The yield amounted, in general, to 20.5%.

The fractions 266–419 contained 4.6 g. of a uniform substance which, when crystallized from methylene chloride/isopropyl ether, yielded 6β-fluoro-17α-methyl-17β-acetoxy-9β,10α-androst-4-en-3-one, melting point 168–170°, UV: $\lambda_{max.}$ 233 m$\mu$, $\epsilon$=16800, $$[\alpha]_{589}^{25°} = -119°$$

(c.=0.1 in dioxan). The average yield is 10.5%. IR-bands at 5.80; 6.00; 6.16; 7.28; 7.77; 7.93$\mu$.

The α-isomer is anabolically/androgenically active; acts uterotrophically, inhibits the action of exogenic estradiol and shows estrogen-like action in intact animals. The β-isomer is anabolically/androgenically active and acts as a strong gestagen orally.

Example 6

To a solution of 1.93 g. of 3,17β-diacetoxy-17α-methyl-9β,10α-androsta-3,5-diene in 30 ml. of ether cooled to 0° was added dropwise a solution of 3.7 g. of potassium acetate in 80 ml. of 85% acetic acid. To this mixture was added dropwise at 5–10° a solution of 0.23 ml. of bromine in 11 ml. of glacial acetic. Subsequently the mixture was stirred for a further 10 minutes, then poured into 300 ml. of ice-water and extracted with ether. The ether extract was washed neutral, dried with sodium sulphate and evaporated. After a two-fold recrystallization the 6β - bromo-17α-methyl-17β-acetoxy-9β,10α-androst-4-en-3-one melted at 129–130°.

UV: $\lambda_{max.}$ 236 m$\mu$, $\epsilon$=12800;

$$[\alpha]_{589}^{25°} = -86°$$

(c.=0.1 in dioxan); IR-bands at 5.83; 5.99; 6.19 and 7.93$\mu$.

The compound inhibits exogenic testosterone in juvenile male rats.

Example 7

A solution of 846 mg. of 6β-bromo-17α-methyl-17β-acetoxy-9β,10α-androst-4-en-3-one, 30 mg. of p-toluenesulphonic acid and 0.6 g. of orthoformic acid ethyl ester in 15 ml. of dioxan was allowed to stand in the dark for 7 hours at room temperature. This solution was added, while stirring, to a mixture of 4.15 g. of manganese dioxide, 45 ml. of glacial acetic and 3.5 ml. of water. It was stirred for 35 minutes and thereafter filtered. The filtrate was poured into ice-water and extracted with methylene chloride/petroleum ether. The crude product obtained from the extract was chromatographed on silica gel with elution with benzene/acetone (98:2) and yielded 6-bromo-17α-methyl-17β-acetoxy-9β,10α-androsta-4,6-dien-3-one, melting point 102° (under decomposition) after crystallization from acetone/hexane.

UV: $\lambda_{max.}$ 289 mμ, ε=19800;

$$[\alpha]_{589}^{25°} = -361°$$

(c.=0.1 in dioxan); IR-bands at 5.81; 6.04; 6.25; 6.34; 7.36; 8.02μ.

The compound is anabolically/androgenically active; acts uterotrophically and inhibits the action of exogenic estradiol.

Example 8

60 ml. of benzene were distilled off from a solution of 11.8 g. of 17α-ethyl-17β-acetoxy-9β,10α-androst-4-en-3-one and 1.18 g. of p-toluenesulphonic acid in 400 ml. of benzene. Then, within 6 hours, a mixture of 120 ml. of isopropenyl acetate and 200 ml. of benzene was added dropwise while 300 ml. of benzene were simultaneously distilled off through a Vigreux-column. The reaction mixture was cooled down and treated with 0.7 ml. of pyridine. It was allowed to stand for 10 minutes, the precipitate filtered off and the filtrate evaporated in vacuum. The crude oily product (11.5 g.) was dissolved in petroleum ether/benzene (1:1) and the solution filtered through 55 g. of silica gel. After concentration of the filtrate there were obtained 9.9 g. of 3,17β-diacetoxy-17α-ethyl-9β,10α-androsta-3,5-diene as a yellowish oil, $\lambda_{max.}$ 234 mμ, ε=13000.

4.9 g. of this 3,17β-diacetoxy-17α-ethyl-9β,10α-androsta-3,5-diene were dissolved in 10 ml. of ether and added to a solution of 9.0 g. of potassium acetate in 190 ml. of 85% acetic acid. To this mixture was added dropwise at 0° to −5° a solution of 0.78 g. of chlorine in 25 ml. of acetic acid. It was stirred for 10 minutes at 0°, poured into ice-water and extracted with ether. The ether extracts were washed with sodium bicarbonate solution and water, dried with sodium sulphate and evaporated in vacuum. The crude product was chromatographed on silica gel. The fractions shown to be uniform by means of thin-layer chromatography were combined and yielded 6β-chloro-17α-ethyl-17β-acetoxy-9β,10α-androst-4-en-3-one of melting point 159–161° (from acetone/hexan).

UV: $\lambda_{max.}$ 235 mμ, ε—15000;

$$[\alpha]_{589}^{25°} = -103°$$

(c.=0.1 in dioxan); IR-bands at 5.78; 6.00; 6.19; 6.79; 7.08; 7.34; 7.99μ.

The compound acts orally as a strong gestagen and shows estrogen-like action in intact animals.

Example 9

A solution of 1.8 g. of 6β-chloro-17α-ethyl-17β-acetoxy-9β,10α-androst-4-en-3-one, 100 mg. of p-toluenesulphonic acid and 1.5 g. of orthoformic acid ethyl ester in 25 ml. of dioxan was allowed to stand for 6 hours at 25°, thereafter the solution was added in 5 minutes to a mixture of 9.0 g. of manganese dioxide, 100 ml. of acetic acid and 7.4 ml. of water. After stirring for 30 minutes the precipitate was filtered off and the filtrate poured into ice-water. It was extracted with methylene chloride/petroleum ether, washed neutral with water and dried over sodium sulphate. After chromatography on aluminium oxide there was obtained 6-chloro-17α-ethyl-17β-acetoxy-9β,10α-androsta-4,6-dien-3-one as a yellowish oil, which did not crystallize.

UV: $\lambda_{max.}$ 285 mμ, ε=18000;

$$[\alpha]_{589}^{25°} = -338°$$

IR-bands at 1736, 1675, 1621, 1592, 1247 cm.⁻¹.

Example 10

A solution of 200 mg. of lithium aluminium hydride in 20 ml. of absolute ether was added dropwise within 10 minutes while stirring and cooling to a solution of 575 mg. of 6-chloro-17α-ethyl-17β-acetoxy-9β,10α-androsta-4,6-dien-3-one in 20 ml. of absolute ether. Subsequently the mixture was stirred for a further 15 minutes at 0°, then carefully treated with moist ether and sodium sulphate solution. The precipitate formed was filtered off and the filtrate concentrated to dryness, whereby 520 mg. of a white foamy residue was obtained. This residue was dissolved in 40 ml. of chloroform and stirred for 2 hours at room temperature with 3.0 g. of manganese dioxide. After removal of the manganese dioxide, the filtrate yielded 490 mg. of a crude product which was chromatographed on silica gel. The benzene/ether eluate was recrystallized from acetone/isopropyl ether and yielded 150 mg. of pure 6-chloro-17α-ethyl-17β-hydroxy-9β,10α-androsta-4,6-dien-3-one of melting point 155–157°.

UV: $\lambda_{max.}$ 289 mμ, ε=20500;

$$[\alpha]_{589}^{25°} = -445°$$

(c.=0.1 in dioxan); IR-bands at 2.85; 6.03; 6.21; 6.30; 6.84; 7.10μ.

The compound is anabolically/androgenically active.

Example 11

16.2 g. of crude 3,17β-diacetoxy-17α-ethyl-9β,10α-androsta-3,5-diene were treated in a solution of 8.1 g. of anhydrous potassium acetate in 375 ml. of acetone and 225 ml. of ethanol with perchloryl fluoride for 7 hours. There were obtained 16.1 g. of a crude product which was chromatographed on 200 ml. of silica gel using methylene chloride/acetone (19:1) as the elution agent. 25 ml.-fractions were collected. The fractions 11 to 40 contained 11.91 g. of a mixture of 6β-fluoro- and 6α-fluoro - 17α - ethyl - 17β-acetoxy-9β,10α-androst-4-en-3-one. This mixture was chromatographed on 400 ml. of silica gel using methylene chloride in fractions of 25 ml. The fractions 166 to 260 contained 3.65 g. of substantially pure 6α - fluoro - 17α-ethyl-17β-acetoxy-9β,10α-androst-4-en-3-one. After repeated recrystallization from isopropyl ether, the product melted at 152–153°. The yield was 1.71 g.

UV: $\lambda_{max.}$ 233 mμ, ε=13200;

$$[\alpha]_{589}^{25} = -72°$$

IR-bands at 1727, 1682, 1628 and 1261 cm.⁻¹.

The fractions 261 to 295 contained a 2:1 mixture of the 6β- and the 6α-isomer, which could be separated by thin-layer chromatography using methylene chloride/1% acetone as the solvent. There were obtained, besides 30 mg. of the 6α-isomer, 70 mg. of pure 6β-fluoro-17α-ethyl-17β-acetoxy-9β,10α-androst-4-en-3-one of melting point 152–154°.

UV: $\lambda_{max.}$ 234 mμ, ε=16400;

$$[\alpha]_{589}^{25} = -132°$$

IR-bands at 1720, 1673, 1619 and 1266 cm.⁻¹.

Example 12

A solution of 81 g. of potassium acetate in 845 ml. of 85% acetic acid was added to a solution of 42 g. of 3,17β- diacetoxy-17α-ethinyl-9β,10α-androsta-3,5-diene in 420 ml. of methylene chloride at 5°. Thereafter, 9 g. of chlorine in 200 ml. of acetate acid were added dropwise and subsequently the mixture was stirred for a further 5 minutes. There were obtained 47 g. of a yellow oil which crystallized from methylene chloride/isopropyl ether yielding 13.1 g. of pure 6β-chloro-17α-ethinyl-17β-acetoxy-9β,10α-androst-4-en-3-one of melting point 205–207°.

UV: $\lambda_{max.}$ 234 m$\mu$, $\epsilon$=16000;

$$[\alpha]_{589}^{25} = -116°$$

IR-bands at 3298, 2108, 1745, 1671, 1618 and 1250 cm.$^{-1}$.
The compound is progestationally active.

*Example 13*

A solution of 5 g. of 6β-chloro-17α-ethinyl-17β-acetoxy-9β,10α-androst-4-en-3-one, 4.5 ml. of ethyl orthoformate and 0.25 mg. of p-toluene-sulphonic acid in 70 ml. of dioxan was allowed to stand in the dark for 5½ hours. This solution was added dropwise to a suspension of 24.5 g. of manganese dioxide in 220 ml. of glacial acetic and 18 ml. of water within 10 minutes.

There were obtained 5.1 g. of a crude product which, after recrystallization from methylene chloride/isopropyl ether, yielded 3.2 g. of pure 6-chloro-17α-ethinyl-17β-acetoxy-9β,10α-androsta-4,6-dien-3-one of melting point 244–245°.

UV: $\lambda_{max.}$ 283 m$\mu$, $\epsilon$=21900;

$$[\alpha]_{589}^{25} = -440°$$

IR-bands at 3104, 3232, 2301, 1741, 1670, 1657, 1614, 1580 and 1247 cm.$^{-1}$.
The compound is progestationally active.

*Example 14*

1.75 g. of dichlorodicyanobenzoquinone were added to a solution of 2.5 g. of 6-chloro-17α-ethinyl-17β-acetoxy-9β,10α-androsta-4,6-dien-3-one in 80 ml. of dioxan containing 1‰ hydrogen chloride. The mixture was stirred under nitrogen for 2½ hours at room temperature. Thereafter 500 mg. of sodium bicarbonate were added and the mixture was refluxed for 15 minutes. After cooling the mixture was filtered and the filtrate was concentrated in vacuo. The residue was filtered through 100 ml. of silica gel using methylene chloride/5% acetone as the elution agent. The main fraction contained 2 g. of material, which was chromatographed on 80 ml. silica gel using isopropyl ether/2% methanol. 15 ml.-fractions were collected. The fractions 9–22 containing 1 g. of 6-chloro - 17α - ethinyl-17β-acetoxy-9β,10α-androsta-1,4,6-dien-3-one yielded, after recrystallization, 0.95 g. of an analytically pure product of melting point 195–196°.

UV: $\lambda_{max.}$ 226 m$\mu$, $\epsilon$=11100;
$\lambda_{max.}$ 256 m$\mu$, $\epsilon$=10400;
$\lambda_{max.}$ 296 m$\mu$, $\epsilon$=11100;

$$[\alpha]_{589}^{25} = -303°$$

IR-bands at 3308, 3234, 2108, 1740, 1660, 1608, 1588 and 1248 cm.$^{-1}$.

This compound shows very marked activity in the Clauberg test for progestational compounds, and strongly inhibits testicular growth in juvenile male rats.

*Example 15*

A solution of 1.8 g. of 6-chloro-17α-ethinyl-17β-acetoxy-9β,10α-androsta-4,6-dien-3-one in 70 ml. of tetrahydrofuran was added dropwise to a suspension of 900 mg. of lithium aluminium hydride in 70 ml. of tetrahydrofuran within 20 minutes at 0°. After 15 minutes, the mixture was heated for 15 minutes to 15°. 120 ml. of tetrahydrofuran/water (10:1) were then added slowly followed by the addition of 4 ml. of saturated sodium sulfate solution. The precipitate was filtered off and washed with 50 ml. of tetrahydrofuran. The combined filtrates were concentrated, the residue was dissolved in 120 ml. of methylene chloride and after the addition of 11 g. of manganese dioxide, the solution was vigorously stirred for 18 hours under nitrogen. After the addition of a further 15 g. of manganese dioxide stirring was continued for 6 hours. The reaction mixture was then filtered and the filtrate was evaporated in vacuo. There were obtained 1.2 g. of yellow crystals which after recrystallization from methylene/isopryl ether yielded 0.7 g. of pure 6-chloro-17α-ethinyl-17β-hydroxy-9β,10α- androsta-4,6-dien-3-one of melting point 182–183°.

UV: $\lambda_{max.}$ 286 m$\mu$, $\epsilon$=21600;

$$[\alpha]_{589}^{25} = -507°$$

IR-bands at 3518, 3238, 2088, 1648, 1607 and 1580 cm$^{-1}$.
The compound is a gestagen.

*Example 16*

A solution of 3.45 g. of 6-chloro-17α-ethinyl-17β-hydroxy-9β,10α-androsta-4,6-dien-3-one and 2.65 g. of dichlorodicyanobenzoquinone in 120 ml. of dioxan containing 1‰ hydrogen chloride was allowed to stand for 5 hours in the dark at room temperature. Thereafter, 800 mg. of sodiumbicarbonate were added, the mixture was refluxed for 15 minutes, cooled and filtered. The filtrate was concentrated and the residue was filtered through 55 g. of silica gel using methylene chloride/5% acetone as the solvent. The main fraction afforded 2.86 g. of a mixture which was chromatographed on 75 g. of silica gel using isopropyl ether/2% methanol as the solvent. 25 ml.-fractions were collected. The fractions 17–25 contained 1.5 g. of a material (uniform according to plate chromatography) which yielded 0.7 g. of pure 6-chloro-17α-ethinyl-17β-hydroxy-9β,10α-androsta - 1,4,6-trien-3-one of melting point 98–100° (from methylene chloride/isopropyl ether).

UV: $\lambda_{max.}$ 227 m$\mu$, $\epsilon$=11000;
$\lambda_{max.}$ 252 m$\mu$, $\epsilon$=10300;
$\lambda_{max.}$ 300 m$\mu$, $\epsilon$=10600;

$$[\alpha]_{589}^{25} = -321°$$

IR-bands at 3420, 3308, 2105, 1660 and 1607 cm$^{-1}$.
This compound is active in the Clauberg test for progestational compounds.

*Example 17*

21.75 g. of crude 3,17β-diacetoxy-17α-ethinyl-9β,10α-androsta-3,5-diene were treated in a solution of 10.7 g. of potassium acetate in 670 ml. of acetone and 300 ml. of ethanol with perchloryl fluoride for 7.5 hours. There were obtained 20.8 g. of an oily product. A total of 47.7 g. of crude product from different batches was chromatographed on 2.6 kg. of silica gel using benzene/acetone (increasing concentrations from 1 to 12%), collecting 20 ml.-fractions. The fractions 181–281 contained 9.5 g. of substantially pure 6α-fluoro-17α-ethinyl-17β-acetoxy-9β,10α-androst-4-en-3-one of melting point 137.5–140.5° (from isopropyl ether).

UV: $\lambda_{max.}$ 233 m$\mu$, $\epsilon$=13400;

$$[\alpha]_{589}^{25} = -101°$$

IR-bands at 3268, 2101, 1748, 1669, 1618 and 1218 cm$^{-1}$.

The fractions 324–420 contained 5.9 g. of 6β-fluoro-17α-ethinyl-17β-acetoxy-9β,10α-androst-4-en-3-one, pure as shown by plate chromatography. Recrystallization from methylene chloride/isopropyl ether yielded 3.8 g. of said product of melting point 208°.

UV: $\lambda_{max.}$ 235 m$\mu$, $\epsilon$=16000;

$$[\alpha]_{589}^{25} = -153°$$

IR-bands at 3257, 2092, 1745, 1658, 1618 and 1217 cm$^{-1}$.

Isomerization of the 6α-fluoro isomer with HCl in chloroform yielded the 6β-fluoro isomer as the main isomerization product. These compounds are progestationally active.

Example 18

500 mg. of 6α-fluoro-17α-ethinyl-17β-acetoxy-9β,10α-androst-4-en-3-one and 430 mg. of dichlorodicyanobenzoquinone were dissolved in 25 ml. of benzene and refluxed under nitrogen in the dark for 20 hours. Thereafter, a further 215 mg. of dichlorodicyanobenzoquinone dissolved in 10 ml. of benzene and after a further 24 hours a further 215 mg. of dichlorodicyanobenzoquinone dissolved in 10 ml. of benzene were added and subsequently, the mixture was refluxed for another 26 hours. After the addition of 200 mg. of sodium bicarbonate and 20 ml. of dioxan the mixture was heated under reflux for 1.5 hours, then filtered and the filtrate was evaporated in vacuo. The crude product was chromatographed on 100 ml. of silica gel using benzene/acetone (2–4%) and collecting 5 ml.-fractions. The fractions 58–88 contained 164 mg. of uniform material. After recrystallization from methylene chloride/isopropyl ether, there were obtained 116 mg. of pure 6α-fluoro-17α-ethinyl-17β-acetoxy-9β,10α-androsta-1,4-dien-3-one of melting point 186°.

UV: $\lambda_{max.}$ 242 mμ, ε=16200;

$[\alpha]_{589}^{25} = -21°$

IR-bands at 3289, 2096, 1733, 1658, 1618 and 1238 cm$^{-1}$.

Example 19

Tablets containing one of the 6-halogen-9β,10α-steroids of the general Formula I as the active ingredient may have the following compositions:

(a)

|  | Mg. |
|---|---|
| Active ingredient (e.g. 6-chloro-17α-methyl-17β-acetoxy-9β,10α-androsta-1,4,6-trien-3-one) | 1 |
| Lactose | 75 |
| Corn starch | 72.5 |
| Talc | 1.35 |
| Magnesium stearate | 0.15 |
| Total weight | 150.00 |

(b)

| Active ingredient (e.g. 6-chloro-17α-methyl-17β-acetoxy-9β,10-androsta-4,6-dien-3-one) | 5 |
|---|---|
| Lactose | 71 |
| Corn starch | 71 |
| Talc | 2.7 |
| Magnesium stearate | 0.3 |
| Total weight | 150.0 |

(c)

| Active ingredient (e.g. 6-chloro-17α-methyl-17β-acetoxy-9β,10α-androsta-4,6-dien-3-one) | 1 |
|---|---|
| Lactose | 75 |
| Corn starch | 71 |
| Talc | 2.7 |
| Magnesium stearate | 0.3 |
| Total weight | 150.0 |

The above compounds are capable of inducing a positive nitrogen balance following daily oral intake of 1 to 5 mg. in humans.

We claim:

1. 9β,10α-steroids of the formula

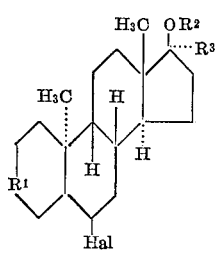

(I)

wherein R$^1$ is a member selected from the group consisting of the 3-keto-4-dehydro-system, the 3-keto-4,6-bisdehydro-system, the 3-keto-1,4-bisdehydro-system, the 3-keto-1,4,6-trisdehydro-system and the 3-alkoxy-3,5-bisdehydro-system, OR$^2$ is a member selected from the group consisting of hydroxy, acyloxy and etherified hydroxy, R$^3$ is a member selected from the group consisting of alkyl and alkenyl and Hal is a halogen selected from the group consisting of fluorine, chlorine and bromine.

2. 9β,10α-steroids of the formula

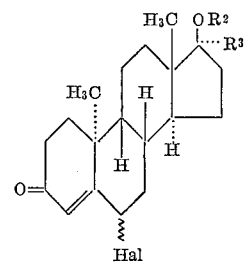

(Ic)

wherein OR$^2$ and R$^3$ have the meanings given in claim 1 and Hal is a halogen selected from the group consisting of fluorine, chlorine and bromine in α- or β-position.

3. 9β,10α-steroids of claim 2, wherein R$^3$ is a lower alkyl group.

4. 9β,10α-steroid of claim 2, wherein R$^3$ is a lower alkinyl group.

5. 6β-chloro-17α-methyl-17β-acetoxy-9β,10α-androst-4-en-3-one.

6. 6β-chloro-17α-ethyl-17β-acetoxy-9β,10α-androst-4-en-3-one.

7. 6α-fluoro-17α-methyl-17β-acetoxy-9β,10α-androst-4-en-3-one.

8. 6β-fluoro-17α-methyl-17β-acetoxy-9β,10α-androst-4-en-3-one.

9. 6α-fluoro-17α-ethyl-17β-acetoxy-9β,10α-androst-4-en-3-one.

10. 6β-fluoro-17α-ethyl-17β-acetoxy-9β,10α-androst-4-en-3-one.

11. 6β-bromo-17α-methyl-17β-acetoxy-9β,10α-androst-4-en-3-one.

12. 6β-chloro-17α-ethinyl-17β-acetoxy-9β,10α-androst-4-en-3-one.

13. 6α-fluoro-17α-ethinyl-17β-acetoxy-9β,10α-androst-4-en-3-one.

14. 6β-fluoro-17α-ethinyl-17β-acetoxy-9β,10α-androst-4-en-3-one.

15. 9β,10α-steroids of claim 1, wherein R$^1$ is a 3-keto-4,6-bisdehydro-system, OR$^2$ is a member of the group consisting of hydroxy and acyloxy and R$^3$ is a member selected from the group consisting of lower alkyl and lower alkenyl.

16. 6-chloro-17α-methyl-17β-acetoxy-9β,10α-androsta-4,6-dien-3-one.

17. 6-chloro-17α-ethyl-17β-acetoxy-9β,10α-androsta-4,6-dien-3-one.

18. 6-chloro-17α-ethinyl-17β-acetoxy-9β,10α-androsta-4,6-dien-3-one.

19. 6-chloro-17α-methyl-17β-hydroxy-9β,10α-androsta-4,6-dien-3-one.

20. 6-chloro-17α-ethyl-17β-hydroxy-9β,10α-androsta-4,6-dien-3-one.

21. 6-chloro-17α-ethinyl-17β-hydroxy-9β,10α-androsta-4,6-dien-3-one.

22. 6-bromo-17α-methyl-17β-acetoxy-9β,10α-androsta-4,6-dien-3-one.

23. 9β,10α-steroids of claim 1 wherein R$^1$ is a 3-keto-1,4,6-trisdehydro-system, OR$^2$ is a member of the group consisting of hydroxy and acyloxy, and R$^3$ is a member selected from the group consisting of lower alkyl and lower alkenyl.

24. 6-chloro-17α-methyl - 17β - acetoxy-9β,10α-androsta-1,4,6-trien-3-one.

25. 6-chloro-17α-ethinyl - 17β - acetoxy-9β,10α-androsta-1,4,6-trien-3-one.

26. 6-chloro - 17α - ethinyl-17β-hydroxy-9β,10α-androsta-1,4,6-trien-3-one.

27. 6α-fluoro-17α-ethinyl - 17β - acetoxy-9β,10α-androsta-1,4-dien-3-one.

References Cited by the Examiner
UNITED STATES PATENTS
3,173,914   5/1965   Bowers _____ 260—239.55

OTHER REFERENCES
Bruckner et al., "Chem. Berichte," vol. 94 (1961), page 1225 relied on.

ELBERT L. ROBERTS, *Primary Examiner.*